United States Patent
Yamaashi et al.

(10) Patent No.: US 6,433,687 B1
(45) Date of Patent: Aug. 13, 2002

(54) MOBILE CONTROL SYSTEM

(75) Inventors: Kimiya Yamaashi, Hitachi; Koichiro Tanikoshi, Hitachinaka; Masayasu Futakawa; Yoshibumi Fukuda, both of Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/249,291

(22) Filed: Feb. 12, 1999

(30) Foreign Application Priority Data

Feb. 26, 1998 (JP) ............................................ 10-045512

(51) Int. Cl.⁷ .............................................. G08B 23/00
(52) U.S. Cl. ............................... 340/573.1; 340/825.36; 340/825.49; 340/286.14
(58) Field of Search ............................... 340/573.1, 573.4, 340/825.49, 825.36, 10.1, 10.51, 505, 539, 5.8, 5.81, 825.47, 10.32, 10.6, 286.14

(56) References Cited

U.S. PATENT DOCUMENTS

| | | | | |
|---|---|---|---|---|
| 5,062,151 A | * | 10/1991 | Shipley | ........................ 359/154 |
| 5,317,309 A | * | 5/1994 | Vercellotti et al. | ........... 340/10.1 |
| 5,402,469 A | * | 3/1995 | Hopper et al. | ................. 379/93 |
| 5,455,851 A | * | 10/1995 | Chaco et al. | ................... 379/38 |
| 5,543,797 A | * | 8/1996 | Hochstein et al. | ............. 342/42 |
| 6,169,484 B1 | * | 1/2001 | Shuchman et al. | ....... 340/573.1 |
| 6,211,781 B1 | * | 4/2001 | McDonald | ................... 340/505 |

* cited by examiner

*Primary Examiner*—Daniel J. Wu
*Assistant Examiner*—Toan Pham
(74) *Attorney, Agent, or Firm*—Antonelli, Terry, Stout & Kraus, LLP

(57) ABSTRACT

A mobile control system capable of identifying a layout condition at a glance and quickly finding and displaying an associated moving body from among many moving bodies, wherein the system is capable of retrieving an object of communication by only designating a site and quickly making communication with the object thus picked out. For controlling moving bodies located in a specific area, the mobile control systems are each provided with a position sensor for detecting a current position or positions of one or more moving bodies located in the specific area and a monitor system for displaying a layout diagram of specific objects located in the specific area and information symbolical of the moving bodies respectively at positions determined on the basis of the current positions of the moving bodies detected by the position sensor in the layout diagram being displayed.

14 Claims, 11 Drawing Sheets

| DEVICE NAME | DEVICE POSITION | DEVICE DISPLAY PATTERN | DEVICE DISPLAY POSITION |
|---|---|---|---|
| FIRST ROLL | (x1,y1) |  (W,H) | (Vx1,Vy1) |
|  |  |  |  |

431 432 433 434 430

| READER NO. | INSTALLED POSITION | ICON DISPLAY POSITION |
|---|---|---|
| 1 | (Tx1,Ty1) | (Vtx1,Vty1) |
|  |  |  |

441 442 443 440

MOBILE CONTROL SYSTEM

BACKGROUND OF THE INVENTION

The present invention relates to a mobile control system for controlling moving bodies present in various places in various facilities, including plants, factories, workshops, offices, hospitals and schools, and particularly to a mobile control system capable of detecting the positions of workers present here and there in facilities and making an appropriate control.

In such facilities as plants and factories it is sometimes necessary to control whereabouts of workers working in the interior of the facilities. A typical example of such a control is an entrance/exit control. A simple method for controlling the entrance and exit is writing destinations on a destination bulletin board. However, this method involves the problem that it is not certain whether the workers who wrote the destinations are surely within their destination rooms or sites. There also is a problem such that it is impossible to cope with forgetting to write and subsequent changes.

According to another control method proposed in view of the above-mentioned problems, a card reader is installed at an entrance/exit of facilities and each person entering or leaving the facilities is required to insert his or her card into the card reader, whereby the control of personnel present within the facilities can be done in a concentrative manner. However, the need of inserting the card into the card reader at every entrance and exit is troublesome for the person entering or leaving the facilities. Particularly, in the case of facilities divided into a large number of sections, the card insertion is needed at every entrance or exit in each of the sections, which is troublesome and inconvenient.

For eliminating the above troublesomeness there has been proposed, for example, such a technique as is described in Japanese Published Unexamined Patent Application No.Hei 8-329298 entitled "Entrance/Exit Control System." The method described therein utilizes a radio technique to control the entrance and exit. According to this conventional method, the name of place stored in each relay station for entrance/exit control is stored, and when a person having a terminal device approaches the relay station, the relay station detects the ID of the terminal device by radio, and the name of the person corresponding to the terminal ID, as well as the name of the place stored in the relay station, are displayed on a central display unit. In this way a room control for the worker can be done even if the worker does nothing.

BRIEF SUMMARY OF THE INVENTION

However, the above conventional method is a mere enrollment display method wherein the names of persons are listed up and respective destinations are displayed. Thus, the said method is not suitable for the purpose of grasping the layout of personnel at a glance. Besides, in the case of a site work of many workers as in a plant, the list becomes too large to write all the names of workers, that is, there arises the problem that it is impossible to see all the names at a glance.

Further, even when it is intended to make contact with a worker present in an interested site, or a site to be contacted, not a specific person, and with the use of the foregoing list, it is necessary to take the trouble to grasp who the workers present in the site are from the list of many workers, then decide with which worker contact is to be made, and contact the worker thus decided. Consequently, where many workers are working at many sites, there arises the problem that it is difficult to look up a worker present in a site to be contacted.

The above problems are true of not only personnel but also moving bodies which move in a specific area.

It is the first object of the present invention to provide a mobile control system capable of grasping the condition of layout at a glance and quickly indicating a related moving body from among a lot of moving bodies.

It is the second object of the present invention to provide a mobile control system capable of looking up an object of communication merely by designating a site and making communication quickly with the object thus picked out.

In order to achieve the above first object, according to the present invention, in the first aspect thereof, there is provided a mobile control system for controlling moving bodies located in a specific area, the mobile control system comprising:

a position sensor for detecting a current position or positions of one or more moving bodies located in the said specific area; and a monitor system for displays a layout diagram of specific objects located in the said specific area and information symbolical of each of the moving bodies at positions in the said layout diagram being displayed, the said positions being determined on the basis of the current positions of the moving bodies detected by the said position sensor.

According to the present invention, in the second aspect thereof, there is provided a mobile control system for controlling moving bodies located in a specific area, the mobile control system comprising:

a position sensor for detecting a current position or positions of one or more moving bodies located in the said specific area; and a monitor system which displays a layout diagram of specific objects located in the said specific area and which, upon receipt of an input indicating any of the displayed objects, checks whether there is any moving body in a predetermined region the current position of which moving body has been detected by the said position sensor, with respect to the indicated object, and if the said moving body is present, displays information symbolical of the moving body at a position in the said layout diagram being displayed, the said position. being determined on the basis of the current position of the moving body.

According to the present invention, in the third aspect thereof, there is provided a mobile control system for controlling moving bodies located in a specific area, the mobile control system comprising:

a position sensor for detecting a current position or positions of one or more moving bodies located in the said specific area; and a monitor system which displays a layout diagram of specific objects located in the said specific area and which, upon receipt of an input indicating any area in said layout diagram, checks whether there is any moving body in the indicated area the current position of which moving body has been detected by the said position sensor, and if the said moving body is present, displays information symbolical of the moving body at a position in the said layout diagram being displayed which position is determined on the basis of the current position of the moving body.

In the above mobile control systems, the position sensor may comprise branch devices mounted respectively on the moving bodies and each having a peculiar identifier and master devices disposed at plural places in the said specific area to detect the identifiers of the branch devices when the branch devices are located within a detectable region.

The monitor system may be constructed so as to display a specific pattern as the information symbolical of each moving body. In connection with the said information, there may be conducted a processing to further display the name of the moving body concerned at a position adjacent to the specific pattern.

Further, according to the present invention, in the fourth aspect thereof, there is provided a mobile control system for controlling one or more moving bodies moving in a specific area, the mobile control system comprising:

a position sensor for detecting a current position or positions of one or more moving bodies located in the said specific area;

a display unit for displaying an image;

a memory unit which stores at least information necessary for displaying a layout diagram of specific objects located in the said specific area and information necessary for displaying the current positions of the moving bodies detected by the said position sensor;

a central information processing system which updates the information stored in the said memory unit on the basis of the current positions of the moving bodies detected by the said position sensor and which performs a processing for displaying on the said display unit the said layout diagram of the objects and the current positions of specific moving bodies; and an input device for receiving directions for the central information processing system, wherein the memory unit stores information indicative of positions of the objects included in the layout diagram, graphic information for displaying the layout diagram and related display position information, information indicative of the current positions of the detected moving bodies, graphic information symbolical of the moving bodies and related display position information, and the central information processing system, upon receipt by the input device of an indication designating a specific object included in the layout diagram being displayed on the display unit, looks up moving bodies whose current positions lie in a predetermined region based on the current position of the designated object, and with respect to only the thus-retrieved moving bodies, performs a processing for displaying their symbolical patterns on the display unit at positions indicated by the display position information.

In order to achieve the foregoing second object, according to the present invention, in the fifth aspect thereof, there is provided, in combination with any of the mobile control systems in the above first to fourth aspects, a mobile control system wherein the moving bodies and the monitor system are each provided with a communication device for mutual communication, and the monitor system, upon receipt of directions of designating any of the patterns symbolical of the moving bodies, performs a processing for making communication through the communication device with the moving body symbolized by the designated pattern.

According to the present invention, in the sixth aspect thereof, there is provided, in combination with a mobile control system in any of the above first to fourth aspects, a mobile control system wherein the moving bodies and the monitor system are each provided with a communication device for mutual communication, and the monitor system performs a processing for displaying patterns symbolical of the objects in the layout diagram, and upon receipt of an indication designating a pattern symbolical of any of the said patterns, and if the current position of any of the moving bodies has been detected in a region predetermined on the basis of the object symbolized by the designated pattern, performs a processing for making communication with the moving body concerned through the said communication device.

As examples of the moving bodies in each of the above aspects of the present invention there are mentioned personnel such as workers who conduct various works in a specific area. A typical application example of the present invention is a personnel control system which is provided with a position sensor for detecting current positions of workers located in a specific area and which controls the workers on the basis of their position data, the personnel control system being characterized by having a display means for displaying, on a map of the said area, position information detected by the said position sensor.

DETAILED DESCRIPTION OF THE INVENTION

Embodiments of the present invention will be described hereinunder with reference to the accompanying drawings.

The present invention is applied to the control of moving bodies moving in a specific area. Particularly, the invention is suitable for the control of persons moving of their own free will. The present invention is widely applicable to the control of personnel in facilities where a plurality of workers are distributed, for example, in plants such as iron and steel plants and nuclear power plants, as well as various manufacturing factories and buildings. Particularly, the present invention is suitable for the control of personnel in facilities where various devices are installed and workers are very likely to be present thereabouts. In the following first embodiment of the present invention, the invention is applied to a personnel control system for controlling workers in an iron and steel plant. In the first embodiment, a factory included as part of the iron and steel plant is assumed to be a specific area to be controlled.

Figure 1:
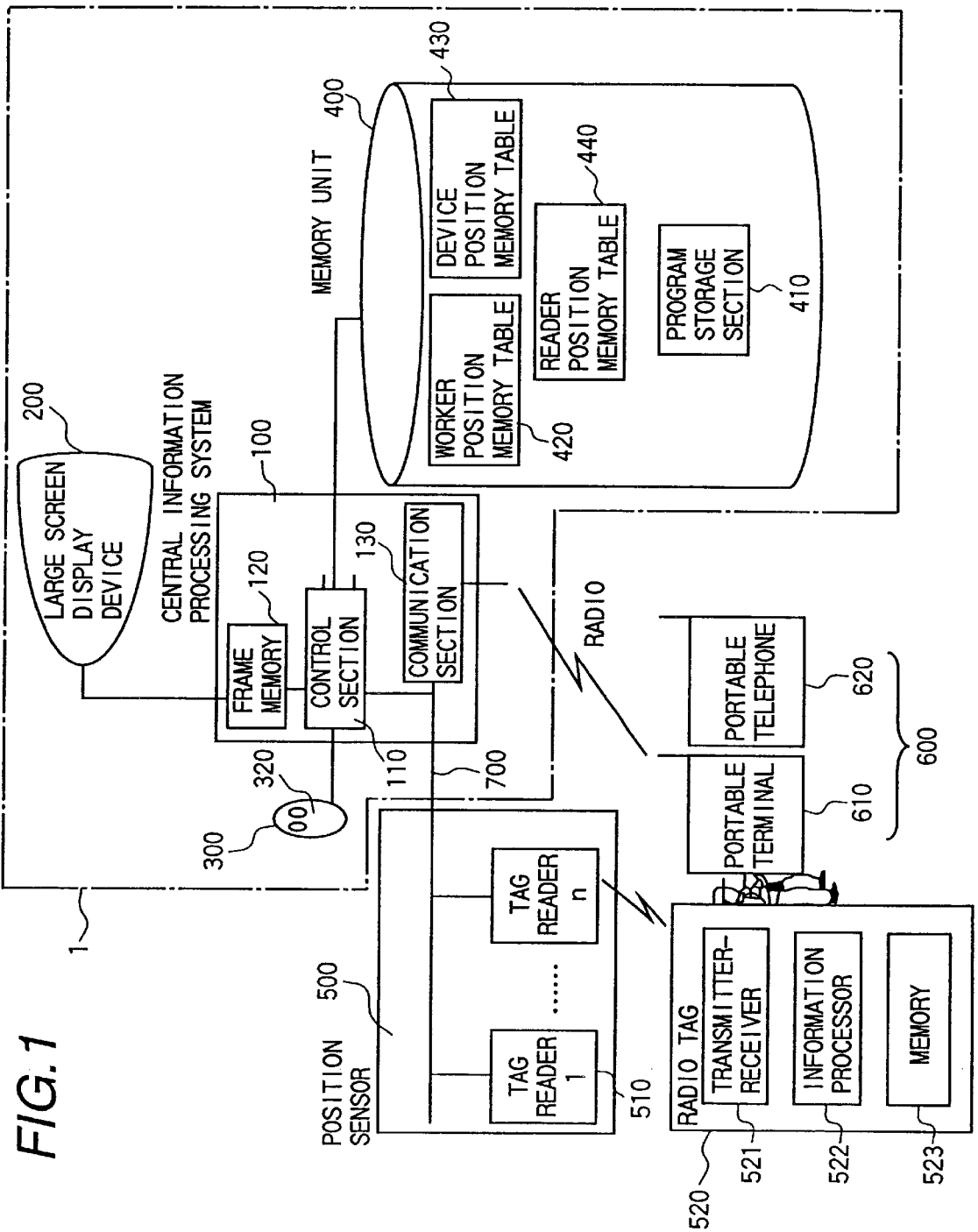
FIG. 1 is a block diagram showing a hardware system configuration of a control system according to the first embodiment of the present invention.
Figure 2:
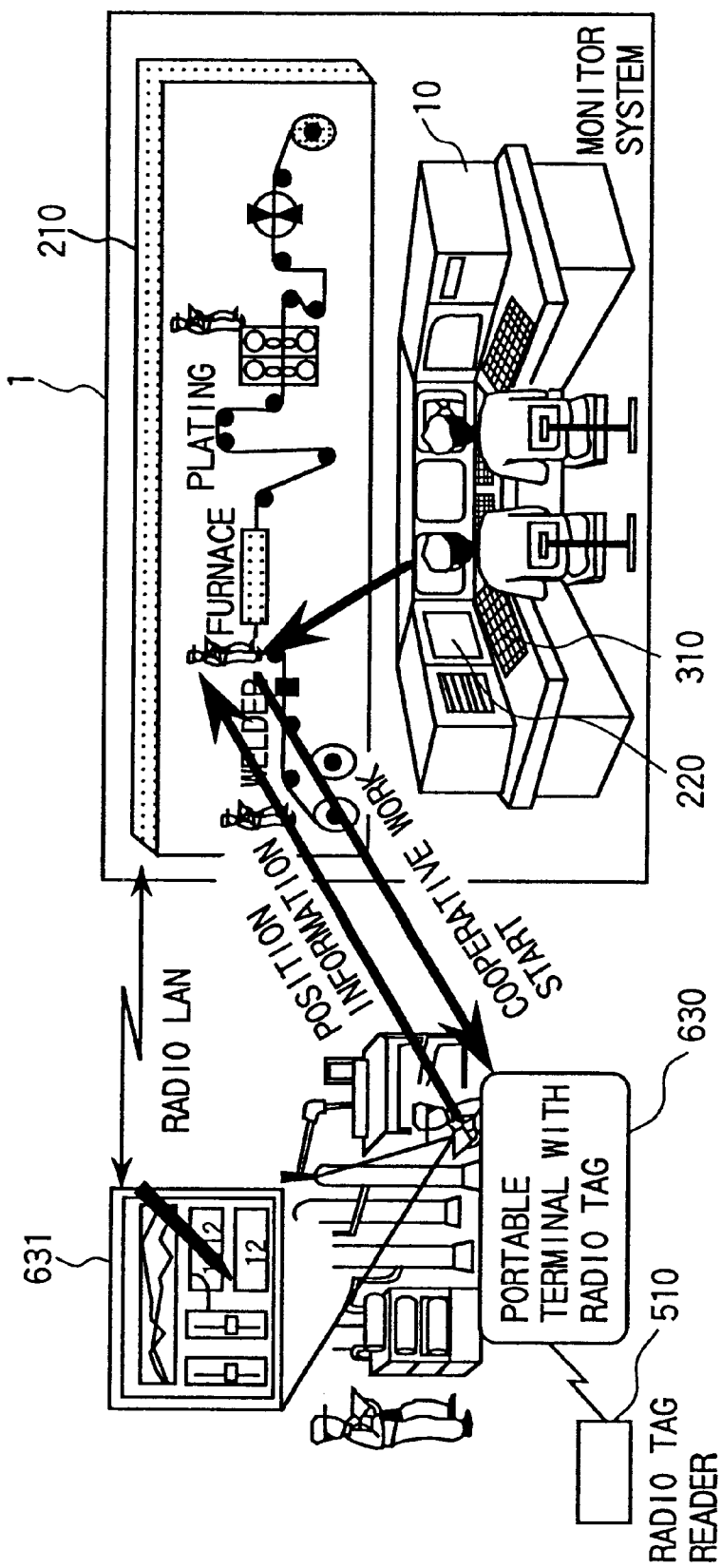
FIG. 2 is an explanatory diagram showing an outline of an operating state in the first embodiment.

In FIG. 1 is illustrated a hardware system configuration used in this embodiment and in FIG. 2 is shown a utilization mode of the system schematically.

As shown in FIGS. 1 and 2, the personnel control system of this embodiment is made up of a central information processing system 100, a display unit 200, an input device 300 and a memory unit 400, which are disposed in a monitor system 1, position sensors 500 dispersed in a factory which is assumed to be a specific area, and a communication device 600 for communication with workers, the communication device 600 comprising a portable terminal 610 and a portable telephone 620. According to a concrete image, for example as shown in FIG. 2, the monitor system 1 comprises a large-screen display unit 210 disposed as the display unit 200 and a console 10 in which accommodated are the central information processing system 100 and the memory unit 400, and provided with desk displays 220 and keyboards 310.

The central information processing system 100 has a control section 110 which executes various information processings, a frame memory 120 which stores images to be displayed on the display unit 200, and a communication section 130 for communication with the communication device 600. The control section 110 is at least provided with a central processing unit (CPU) and a memory though not shown.

The said CPU executes various processings in accordance with programs installed in the memory unit 400. The processings executed in this embodiment include the generation of display images in an area concerned, processing of position information provided from the position sensors 500, display of worker positions, and communication with workers. There is provided a program storage section 410 which stores programs for realizing those processings. As necessary, a program is read out to a memory in the control section 110 and is executed. For example, the program is provided by a storage medium such as CD-ROM and is installed in the memory unit 400 through a CD-ROM drive (not shown). It is also possible to receive the program by communication through the communication section 130 and store it in the memory unit 400.

The communication section 130 is started by the control section 110, then acquires a portable telephone number 423 or a portable terminal number 424, which are stored in a worker position memory table 420 in the memory unit 400, with respect to a designated destination of communication, and communicates with the communication destination. The exchange of communications with the destination is conducted by a telephone set (not shown) in the case of the portable telephone, while in the case of the portable terminal the central information processing system 100 gives and takes information. Although in FIG. 1 the communication section 130 is disposed within the central information processing system 100, no limitation is made thereto. An independent communication device may be provided outside the central information processing system 100 and connected to the same system.

As the display unit 200, as noted above, there are used the large screen display unit 210 and a plurality of desk displays 220. The large screen display unit 210 is formed in a size which permits the whole of an area concerned to be seen at a glance and which permits plural persons to monitor the whole area at a time. For example, it may be extended all over a wall surface of the monitor system 1. The desk displays 220 are employable for displaying; the entire area of the large screen on a reduced scale; device by device; only a specified area in an enlarged view; and contents different from the display contents on the large screen unit 210.

As the input device 300 are used, for example, the keyboard 310 shown in FIG. 2 and a mouse 320 shown in FIG. 1. The keyboard 310 can be used in editing various data such as, for example, registration, alteration and deletion of workers names and definition of new tags. The mouse can be used for indicating a specific object in the screen. Further, the input device 300 is used in various operations such as inputting of directions for the central information processing system 100.

The memory unit 400 is constituted by a hard disk unit for example. Of course, no limitation is made thereto. In the memory unit 400 are stored various data in addition to those stored in the program storage section 410. More specifically, the following tables are provided as memory areas: a worker position memory table 420 for the storage of data relating to the positions of workers such as the said positions, display patterns of the workers and information for the linkage thereof, a device position memory table 430 for the storage of data relating to the positions of devices such as the said positions, display patterns of the devices and information for the linkage thereof, and a reader position memory table 440 for the storage of data relating to the positions of tag readers such as specifying of tag readers 510, installed positions thereof and display positions of icons which should be subordinate to the tag readers. The whole or part of the information stored in the memory unit 400 may be stored in the memory incorporated in the control section 110.

The position sensors 500 are each made up of plural tag readers 510 functioning as master devices and plural radio tags 520 functioning as branch devices. The tag readers 510 are disposed at predetermined positions respectively. The radio tags 520 are each provided for each person whose position is to be detected. The tag readers 510 and the radio tags 520 communicate with each other by radio communication. As the radio frequency there is used a radio wave band of 2.45 GHz, 2.455 GHz (10 mW/MHz). In this embodiment, the same frequency is allocated to the radio wave transmitted from the each tag reader 510 and to the radio wave transmitted from each radio tag 520, and no limitation is made thereto. Different frequencies may be allocated respectively to the radio wave from the tag readers 510 and the radio wave from the radio tags 520. The radio wave which is normally transmitted from each radio tag 520 for indicating the presence of the radio tag itself and the radio wave for the exchange of communications between each tag reader and each radio tag may be of different frequencies.

Each tag reader 510 is disposed at a position where a radio tag 520 is to be detected. An area in which each tag reader 510 is to detect a radio tag 520 is set in advance. For example, this can be done by setting a sensitivity in relation to the radio wave intensity of the radio tag 520. A radio wave communication range between the radio tags 520 and the tag readers 510 is determined in consideration of the relation between the installation density of tag readers and the position accuracy thereof. Also as to the radio tags, a distance, e.g. several meters or so, which permits reception of radio wave from the tag readers 510 is established in advance. As a result, if any radio tag 520 is present in the range of several meters in radius of a certain tag reader 510, the radio tag 520 is recognized by the tag reader 510.

The tag readers 510 may be disposed near objects such as installed objects located in a specific area, for example, near installed positions of various working devices if the specific area is within a factory. Thus, since the positions for detection are set in the vicinity of devices as markers which are installed fixedly, the position of each worker can advantageously be grasped more easily on the display screen in relation to the arrangement of devices. In many cases, workers are located near various working devices, so it can be said desirable that devices for detecting their positions be installed at the positions where the workers are usually located. This is also convenient in the case where it is necessary to make contact with any worker associated with a specific device, not a specific worker. This is because if the worker to be contacted is a worker in charge of plating and any person present at the plating position will do, it is more rational to call an associated worker with the device concerned as a key rather than designating and calling a specific person.

Each tag reader 510 may be disposed near a specific installed object or may be disposed at a predetermined certain position. If the area concerned is divided to some extent, each tag reader 510 may be installed for each divided section to detect the position of person.

Each radio tag 520 is provided correspondingly to each person to be detected. Since each person to be detected carries the radio tag 520, identification is made on the basis of the radio tag 520 carried by each person. The radio tag 520 is in itself an independent device, but no limitation is made thereto. It may be carried on a portable terminal. In this case, the terminal is a portable terminal 630 with a radio tag.

As shown in FIG. 1, each radio tag 520 has a transmitter/receiver 521 for radio communication with the tag reader 510, an information processor 522 which performs a processing for the transmission of a specific information in response to communication from the tag reader 510, and a memory 523 which stores a processing program to be carried out by the information processor 522 and also stores an identifier (tag ID) provided to the radio tag concerned.

For the notice of presence of the radio tag 520 concerned, the transmitter/receiver 521 outputs a radio wave of a certain frequency constantly, and upon arrival of an inquiry radio wave from the tag reader 510, receives and demodulates it, then takes out an inquiry signal and sends it to the information processor 522. Although the radio wave for the notice of presence is outputted constantly, it is not required to be continuous insofar as it lasts.

When the transmitter/receiver 521 receives an inquiry signal from the tag reader 510, the information processor 522 reads out information which represents a tag ID peculiar to the radio tag 520 concerned and stored in the memory 523 and sends it to the transmitter/receiver 521, which in turn outputs the information together with a carrier allocated to the tag ID. The transmission of the tag ID can be effected, for example, by phase modulation of the carrier.

Each tag reader 510 is connected to the control section 110 through a signal line 700. That is, each tag reader 510 detects the radio wave of a certain frequency which is outputted from the radio tag 520. When the said radio waves reaches a certain lever or higher, the tag reader 520 communicates with the radio tag 520 and acquires from the radio tag 520 the ID number stored therein. Upon detection of the radio tag 520, the tag reader 510 transmits the tag ID of the detected radio tag 520, as well as the position information of the tag reader, to the control section 110 through the signal line 700. Though not shown, the tag reader 510 basically comprises a transmitter/receiver for radio communication with the radio tag 520, an information processor which makes control for the communication with a radio tag and for the transmission of detected information, and a memory for the storage of program and data used in the information processor.

The communication device 600 is a device which each worker carries to take communication with the monitor system 1. As the communication device 600 there is used, for example, the portable terminal 610 constituted by a small-sized computer or the portable telephone 620. Also employable is a portable terminal which incorporates the radio tag 520 therein, namely, the portable terminal 630 equipped with a radio tag.

Figure 3:
FIG. 3 is an explanatory diagram showing a worker position memory table in which are stored whereabouts of workers respectively.
Figures 4, 5:
FIG. 4 is an explanatory diagram showing a device position memory table in which are registered installed positions of devices respectively.
FIG. 5 is an explanatory diagram showing a reader position memory table in which are registered tag readers and installed positions thereof.

Next, the details of various data stored in the memory unit 400 will now be described with reference to FIGS. 3, 4 and 5. Storage structures of various data shown in FIGS. 3, 4 and 5 are logical structures of the data. For example, they are shown assuming possible states of arrangement in the case of output made by a display unit and a printer, which states are not actual states. Additional types of data may also be stored.

FIG. 5 shows storage contents of the reader position memory table 440. As shown in the same figure, the reader position memory table 440 comprises a reader number 441 indicating the number of each reader 510, an installed position 442 indicating an installed position of each of the tag readers 510 installed in various places, and an icon display position 443 which indicates an icon position for displaying picture elements on the display unit, the picture elements constituting a pattern symbolical of a worker which will be described later. The storage contents of the reader position memory table 440 are determined at the time of installation of the tag readers 510 and are inputted and stored through the input device 300.

The worker position memory table 420 constitutes a data base relating to workers. In the worker position memory table 420, as shown in FIG. 3, there are stored the name 421 and worker position 422 of each worker, information (portable telephone number 423 and IP address 424 of each portable terminal) for communication with a site worker 424 with use of the communication section 130, a tag ID 425 which is stored in each radio tag 520 corresponding to each worker, a worker display pattern (picture elements) 426 of each worker for the formation of an image to be displayed on the display unit, and a display position 427 thereof. Of these information pieces, the worker name 421, information of portable devices (portable telephone number 423, IP address 424 of each portable terminal, radio tag ID number 425), and the display pattern 426, are set beforehand for each worker. In the worker display pattern 426 is also included information of width and height as display sizes of the area in which the worker display pattern is to be displayed. This is defined as a directions receiving area because the worker display pattern is used as an icon. This is also true of the case where a pattern is used as an icon, including a device display pattern to be described later.

The device position memory table 430 constitutes a data base relating to-the arrangement of devices. In the device position memory table 430, as shown in FIG. 4, there are stored the name 431 of each device, a device position 432 indicating an actually installed position of the device, a device display pattern (picture elements) 433 which represents each device for use in forming a device image to be displayed on the display unit 200, as well as a display position 434 of the pattern. In this embodiment, these information pieces are set beforehand for each device.

A modification may be made such that the information of display patterns (picture elements) is stored in pattern files provided separately and pointers indicating storage positions of corresponding pattern files are stored in the columns of worker display pattern 426 and device display pattern 433.

A description will now be given of position information indicating installed positions of various devices such as tag readers 510. The position information is defined by the allocation of addresses with respect to the area concerned. More specifically, coordinates are set in a lattice form. Installed positions of devices are defined by the said coordinates. For example, the installed position 442 of the reader position memory table 440 is defined as (Tx1, Ty1), the device position 432 of the device position memory table 430 is defined as (x1, y1), and the worker position 422 of the worker position memory table 420 is defined as (Px1, Py1), and the thus-defined positions are stored. For the display on the display unit 200 are set screen coordinates which define positions in the display screen. For example, the icon display position of the reader position memory table 440 is defined as (Vtx1, Vty1), the device display position 434 of the device position memory table 430 is defined as (Vx1, Vy1), and the worker display position 427 of the worker position memory table 420 is defined a (Vpx1, Vpy1), and the thus-defined positions are stored. The worker display position 427 corresponds to the icon display position 443 in the reader position memory table 440. It follows that the memory tables 420, 430 and 440 permit coordinates in an actual area and coordinates on the display screen to be stored in a corresponding relation to each other. Thus, the actual installed positions and the positions on the screen can be converted from one to the other.

For determining the coordinates of installed positions, a reference position is determined beforehand for each of various devices. When each device is installed, the coordinates corresponding to the reference position of the device are assumed to be an installed position of the device. As the reference position, it is desirable to select a position where a worker is present in most cases. In the case of a large-sized or long device, a plurality of reference positions may be established. Also on the screen side there is made adjustment so that there are plural positions where workers are to be displayed. The reference positions of devices serve as retrieval key points (retrieval reference points) which function as retrieval keys for looking up associated workers, as will be described later. The reason why devices are made retrieval key points is that device layout diagrams are in many cases provided in various facilities and so the utilization thereof as markers facilitates the setting of retrieval keys. Therefore, in the case where there is no such device as is to be described on a layout diagram, it is also possible to make setting so that each tag reader 510 is installed alone and when an area including the set point of the tag reader is indicated, the position thereof serves as a retrieval key point, though this is not clearly shown in the associated layout diagram.

Now, reference will be made below to matters which are to be display on the display screen of the display unit 200, especially the large-screen display unit 210.

Figure 6:
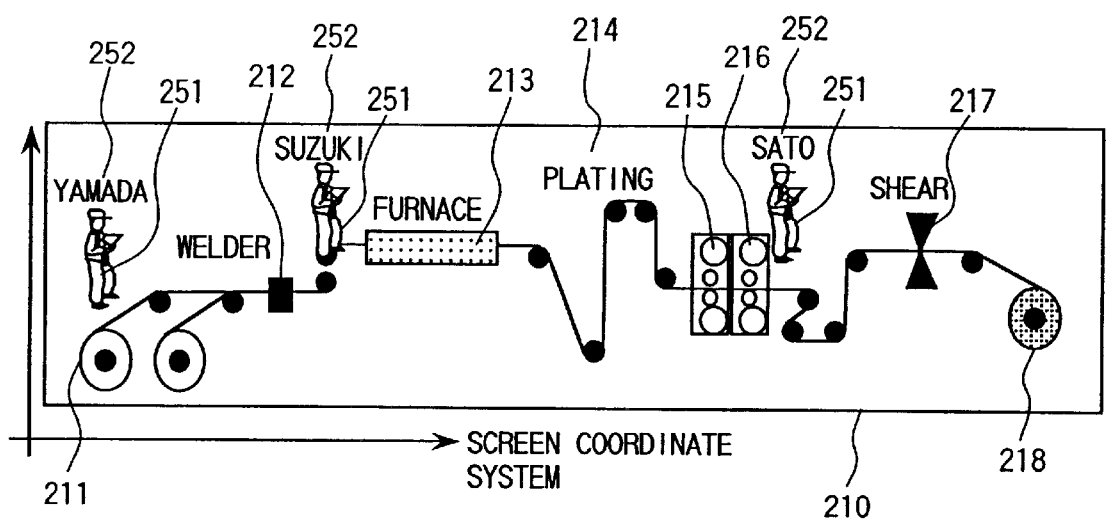
FIG. 6 is an explanatory diagram showing a target example in the first embodiment.
Figure 7A:
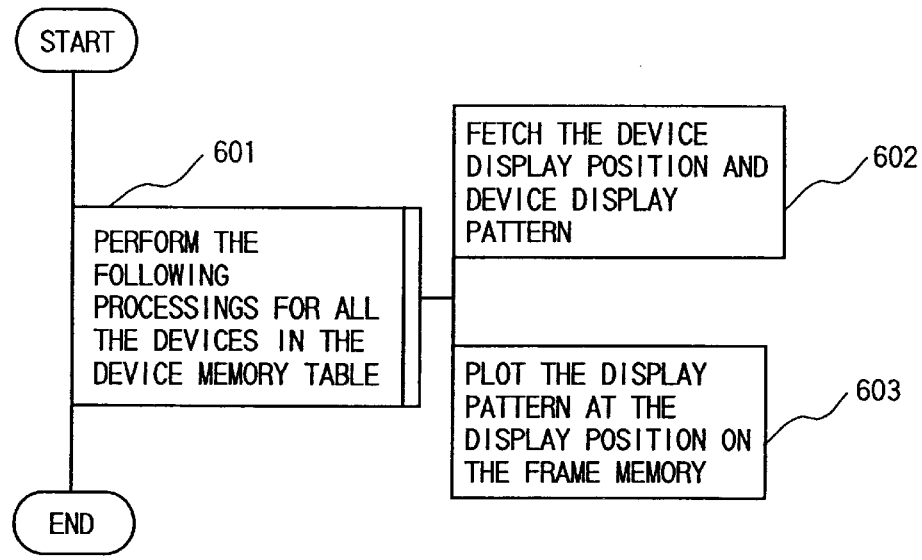
FIG. 7A is an explanatory diagram showing a display procedure for preparing a device layout diagram and FIG. 7B is an explanatory diagram showing a display procedure for preparing a worker layout diagram.
Figure 7B:
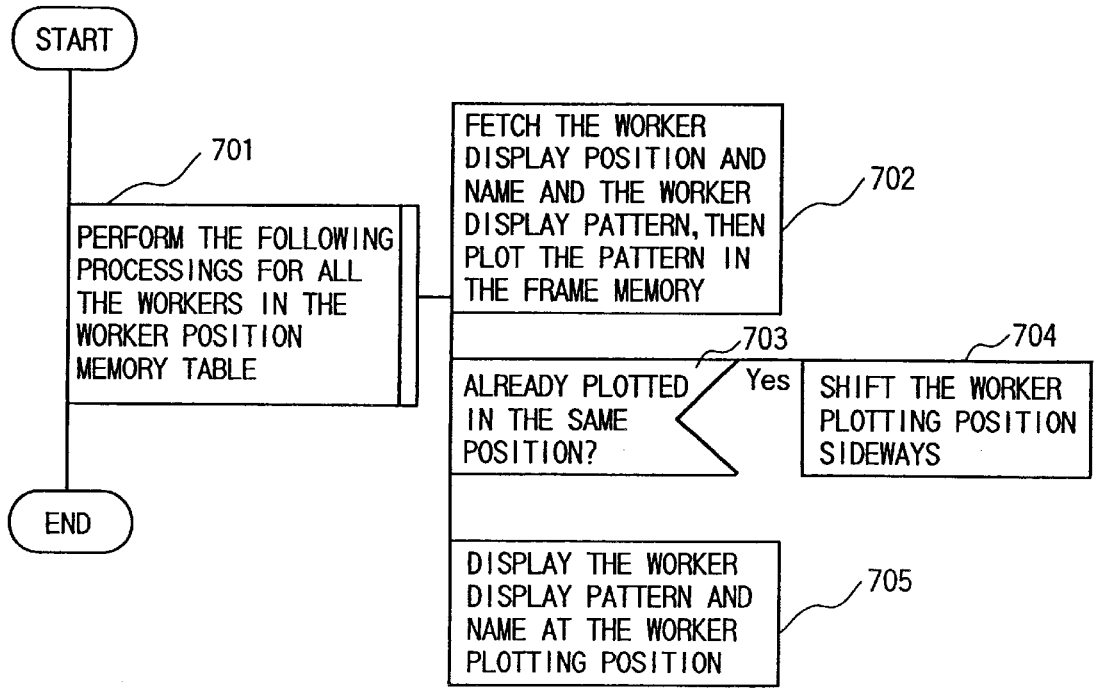

On the basis of the device position memory table 430 in the memory unit 400, the control section 110 prepares such a device layout diagram shown in FIG. 2 and stores this image into the frame memory 120. Further, on the basis of the worker position memory table 420, the control section 110 stores workers' patterns and names in corresponding positions on the device layout diagram stored in the frame memory 120. As shown in FIG. 6, the frame memory 120 controls display in terms of a screen coordinate system in the same manner as the display method on a bit map display. More specifically, an image for graphical display of the device layout diagram and workers is plotted in the frame memory 120 in accordance with such procedures as shown in FIGS. 7A and 7B. The image thus stored in the frame memory 120 is read out at a predetermined certain cycle and is displayed on the display unit 210.

A description will be given below of a preparatory operation which is to be conducted in operating the system of this embodiment.

In using the system of this embodiment, it is necessary to perform a preparatory operation involving the input of data necessary for preparing such a device layout diagram in a factory concerned shown in FIG. 6 and for the display of workers in the same diagram. This preparatory operation involves the input of required data with respect to the foregoing three memory tables 420, 430 and 440. That is, fixative data are stored in the data base.

First, required data are stored in the device position memory table 430 which is for the preparation of a device layout diagram. To be more specific, inputted are the names 431 of various devices installed in a factory as an area concerned, the device positions 432 as positions where the devices are to be installed, device display patterns 433 including device display patterns and related display area, and device display positions 434. The code data concerned can be inputted using the keyboard 310. There may be adopted another inputting method wherein a device installation drawing is inputted using a scanner and is displayed on the display screen of the display unit 200, then the aforesaid various data are defined while editing is performed. In this case, device patterns can be fetched from the displayed image data. If design data of the factory as the area concerned have already been prepared by means of a computer, the inputting operation may be done by fetching the design data. Of course, device display patterns may be formed using a plotting software or device images may be fetched using a scanner, and then may be stored. Devices are arranged on the display screen to constitute such a device layout diagram as shown in FIG. 6.

It is difficult for the arrangement of devices to be in exact agreement with the actual arrangement of devices due to restrictions imposed on the display screen. Therefore, an editing work may be done on the display screen of the display unit 200 so as to change device positions as necessary into a more easily visible screen. This can be done by using an editing software of a screen display type. The position of a device display pattern can be changed by rewriting the corresponding portion in the device position memory table 430. More particularly, the change of the position can be done by shifting the device concerned with use of a mouse or the like on the display screen. A display area can be inputted, for example, by designating it with use of the input device 300.

Next, there is made an input of the reader position memory table 440 which stores the positions of tag readers 510. In this table, for identifying the tag readers arranged, predetermined identifiers (numbers in this embodiment) 441 and coordinates of their installed positions 442 are inputted using the keyboard 310 for example. Of course, this constitutes no limitation. For example, a bar code may be affixed to each tag reader 510 and be read by means of a bar code reader to input the identifier of the tag reader. Correspondingly to each tag reader, the icon display position 443 of the associated worker to be displayed is also inputted. The icon display position 440 may be set in a plural number. The icon display position may be inputted by designating an easily visible position with a mouse 310 or the like on the display screen of the display unit 200.

Next, there is made an input of the worker position memory table 420. In this step, matters which are already known are inputted. More specifically, workers' names 421, portable telephone numbers 423, portable terminal numbers 424, tag IDs 425 of radio tags 520 allocated respectively to workers, worker display patterns which display the positions of workers and which each constitute an icon for indicating communication, as well as the display area thereof 426, are inputted. The worker display patterns can be inputted in the same manner as is the case with the device display patterns described above, that is, by plotting the patterns with use of a plotting software or by fetching images through a scanner. The display area can be inputted, for example, by designating it through the input device 300.

The following description is now provided about the operation for controlling workers with use of the system of this embodiment which has been made stand-by in the above manner. It is assumed that in the system of this embodiment each worker carries a radio tag 520 with his or her ID number recorded therein and a portable telephone 620 or portable terminal 610 for communication. Thus, by having each worker carry the radio tag, the radio tag looks as if it were moved. That is, by detecting the position of the radio tag it is made possible to control the whereabouts of the worker who carries the radio tag. Besides, by having each worker carry the portable telephone or portable terminal it becomes possible to directly contact the worker who carries it.

The control section 110 performs the processing shown in FIG. 7A and prepares a device layout diagram on the frame memory 120. More specifically, the following processings are performed for all the devices stored in the device position memory table 430 successively from the head device (step 601). A device display pattern 433 and a device display position 434 both stored in the device position memory table 430 are fetched (step 602). The control section 110 plots the thus-fetched device display pattern 433 at a position on the frame memory 120 corresponding to the device display position 434 (step 603). In this way a layout diagram corresponding to actual device positions such as that shown in FIG. 6 is stored in the frame memory 120.

Next, on the basis of the worker position memory table 420 and using the method shown in FIG. 7B, the control section 110 plots the positions of workers on the layout diagram stored in the frame memory 120. The control section 110 performs the following processings successively for the information of all the workers stored in the worker position memory table 420 (step 701). Then, the control section 110 fetches both worker display pattern 426 and worker display position 427 stored in the worker position memory table 420 and plots the worker display pattern 426 at a position corresponding to the worker display position 427 on the frame memory 120 (step 702). Further, for the distinction of workers, the control section fetches the name 421 of the worker concerned from the worker position memory table 420 and plots the worker display pattern 426 in such a display form as shown in FIG. 6 (step 705).

As the case may be, a plurality of workers are present at the same place (step 703). In this case, plotting is performed by shifting the display position just sideways of the area stored previously in the frame memory 120 (step 704). In this way it is clearly shown that plural workers are present at the same place. The storage contents of the frame memory 120 are converted as it is into a video signal, which is outputted to the large-screen display unit 210. In the case where plural persons are present around the same device, a worker display pattern may be displayed for only one person and the names of all such persons may be displayed. Alternatively, in the case of plural persons around the same device, only one person may be displayed as a representative and a description like " . . . others" may be added. Where only the representative is displayed, a modification may be made such that the portion " . . . others" is defined specially and when the said portion is indicated with a mouse pointer, the names of persons located therein are displayed as list within a window (see FIG. 8C). This prevents the display of worker positions from becoming complicated at a place where many workers are present concentratively, that is to say, this gives a good view of the display screen.

Further, a person present around a certain device may not be in charge of that device, so a modification may be made such that when a worker display pattern is indicated with a mouse pointer, a section or the like to which the person belongs is displayed in a window to make it clear whether the person concerned is a person in charge of the device or not. In this connection, a worker attribute item may be provided in the worker position memory table and the above data may be stored therein in advance.

In this state, each tag reader 510 detects a radio wave of a certain frequency transmitted from a radio tag 520. This radio wave detection is conducted at all times. The radio wave input from any radio tag reaches a certain level or higher, the reader 510 makes communication with the radio tag 520. To be more specific, the tag reader 510 transmits an inquiry signal to the radio tag 520. Then, the tag reader receives and demodulates the radio wave outputted from the radio tag 520 and acquires the ID number recorded in the tag 520 which has been carried together with the radio wave. When requested from the control section 110 in the central information processing system 100, the tag reader 510 informs the control section of the ID number of the ID number of the radio tag 520 thus detected.

With the number transmitted from the tag reader 510 as a key, the control section 110 retrieves the reader position memory table 440 and acquires the installed position 442 of the tag reader 510. In this way the control section 110 detects that the radio tag 520 is located at the installed position of the tag reader 510 thus detected. The result of the detection is stored as the worker position 422 in the worker position memory table 420 to be described later. The icon display position 443 corresponding to the installed position 442 is utilized as the worker display position 427 in the worker position memory table 420. In the case of the radio tag 520, its radio wave can be detected over a range of several meters or so. If the radio tag 520 is disposed for each detection range, the detection of position can be done in the unit of several meters.

The control section 110 issues the above detection result sending request periodically to all the tag readers 510, then fetches the current positions of all the workers from the position sensor 500 and updates the worker position 422. In this way the system grasps the latest workers' positions at all times.

For checking to which worker the detected radio tag 520 corresponds, the control section 110 retrieves the tag ID 425 in the worker position memory table 420, with the radio tag ID detected from the position sensor 500 as a key, and specifies the worker who carries the detected radio tag 520. Thereafter, the control section 110 fetches from the reader position memory table 440 the installed position 442 of the tag reader 510 which has transmitted the detected radio tag ID number to the control section, and stores the installed position 442 as the worker position 422 in the worker position memory table 420. At the same time, the control section stores the icon display position 443 in the reader position memory table 440 as the display position 427 in the worker position memory table 420.

In the manner described above a user (a supervisor present in the monitor system 1) can see the current positions of workers graphically in the large screen display 210, as shown in FIG. 6, and can quickly grasp in what state the workers are scattered. More specifically, a linearly arranged diagram of devices in a factory and the icons of workers present respectively around various devices are displayed. For example, as such devices, a feed roll 211, a welder 212, a furnace 213, a plating equipment 214, a first roll 215, a second roll 216, a shear 217 and a take-up roll 218 are arranged successively in a linear form. As workers, worker display patterns 251 and specific individual names 252 represented by the patterns are displayed. For example, FIG. 6 illustrates that Mr. Yamada is positioned near the feed roll 211, Mr. Suzuki is positioned between the welder 212 and the furnace 213, and Mr. Sato is positioned behind the second roll 216.

In a large-scale plant such as a nuclear power plant, a very large number of site workers are present and conduct various works. In such a case, if all the workers are simply displayed, the patterns of the many workers are displayed at a time on the screen, which is complicate. Initially, therefore, only a device layout diagram is displayed as in FIG. 8A without displaying all the workers, and then by designating a device on the layout diagram it is made possible to selectively display only the worker working near that device, as shown in FIG. 8B. To be more specific, in FIG. 8A, if the user designates, with the left-hand button of the mouse 320, a device, say the second roll 216, in the layout diagram which has been displayed on the display unit 200 with a mouse pointer 321 as the input device 300, both worker display pattern 251 and name 252 of the worker present near the designated device are displayed as in FIG. 8B via such a procedure as shown in FIG. 9. This can be regarded as a construction wherein the data of the other workers than the worker associated with the designated device are masked and only the unmasked worker data is displayed. Further, as to a place which is defined in connection with an area concerned, other than devices, only the workers associated with a designated place are displayed and the data related to the other places are masked and not displayed. It is the position of the screen coordinate system that is inputted by the input device 300 such as the mouse 320.

As shown in FIG. 9, the control section performs the following processings for all the devices stored in the device position memory table 430, as shown in FIG. 9, (step 901). First, the control section fetches the device display position 434 and device display pattern 433 of a device (step 902), then checks whether the input coordinates designate the device concerned on the basis of the inputted coordinate position and device display position 434 and the size of the display pattern 433 (the size of display area) (step 904). These processings are performed until the inputted device can be specified (steps 905 and 902).

Once the device can be specified, the control section 110 fetches the device position 432 from the device position memory table 430 (step 907) Then, for all the workers in the worker position memory table 430, the control section 110 checks whether the work positions 422 of the workers are within a preset distance centered on a reference region of the device position 432 (step 908), and lists up the workers present near the designated device (step 909). Further, in order for the display to be easily seen, the control section 110 sorts the workers successively in order of shorter distance of the worker position 422 from the device position 432 and displays the result of the sorting (step 910). It is optional whether this display is to be made using the worker display patterns 426 on the screen of the large-screen display unit 210 or it is to be made in a tabulated form.

By the above designating method it is possible to display only the associated worker even when there are many workers and thus it is possible to check workers efficiently. As noted previously and as shown in FIG. 8C, a plurality of workers positioned around a designated device may be displayed as a list using a window 253, as shown in FIG. 8C. Within the window 253, the workers may be sorted in order of shorter distance from the designated device or in order of rank of the workers.

Figure 10:
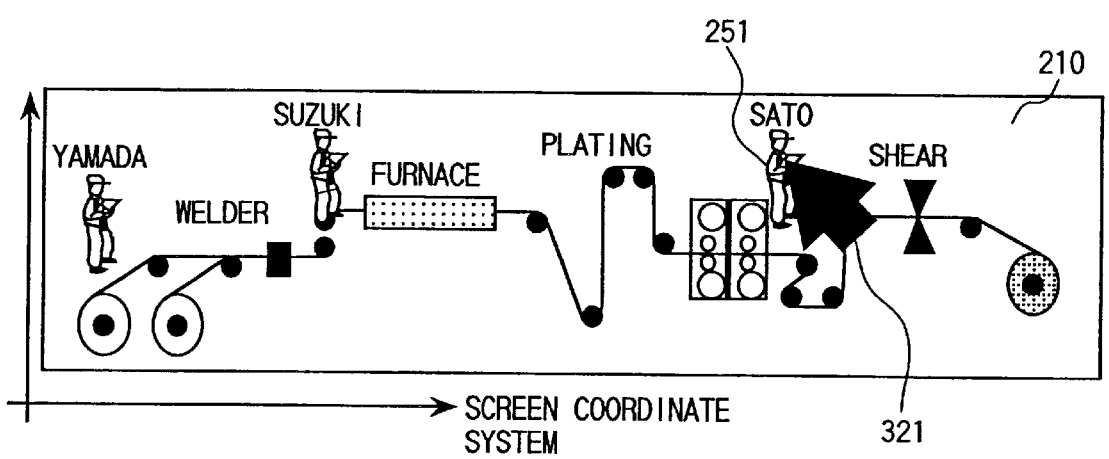
FIG. 10 is an explanatory diagram showing an example of a display screen to be used in making communication with displayed workers.

While a work is being performed, there sometimes occurs a case where communication is to be made with a worker. In this embodiment, as shown in FIG. 10, by merely designating a worker display pattern 252 with the mouth pointer 321 through the input device such as the mouse 320 (the right-hand button of the mouse 320), it is possible to communicate with the designated worker in accordance with steps 1101 to 1105 shown in FIG. 11. As mentioned previously, it is the position of the screen coordinate system that is inputted by the input device 300.

Therefore, with respect to all the workers stored in the worker position memory table 420, the control section 110 fetches the worker display position 427 of a worker and the pattern size in the worker display pattern 426 and checks which worker the inputted screen coordinates designate (steps 1101, 1102, 1103). Once the worker is detected, the control section 110 fetches the number of the portable terminal 434 and that of the portable telephone 433 stored in the worker position memory table 430 (step 1104) and starts communication with the worker through the communication section 130 (step 1105). In this way, by utilizing a spatial sense, it is possible to quickly find out a worker for communication and start communication with the worker.

As to the communication, it is sometimes desired to communicate with not a specific worker but any worker present near the device concerned. Therefore, in this embodiment, as shown in FIG. 10, upon depression of the right-hand button of the mouse 320, the device position 432 and the position of the screen coordinate system inputted by the mouse 320 are checked in the same manner as in FIG. 9 for not only the information alone stored in the worker position memory table 430 but also all the devices stored in the device position memory table 430, and the control section checks whether a device has been designated by the mouse 320 (steps 1106 to 1110). If any device is designated, workers present around that device are specified (steps 1111 to 1114) as is the case with the latter-half processing in FIG. 9, then fetches the numbers of portable terminals 434 and portable telephones 433 of all the specified workers, and starts communication through the communication section 130 (step 1115). Thus, even without specifying a worker, it is possible to make communication with a worker present near the device concerned. In the case where communication is to be made multi-addresswise with persons present near the device concerned, a communication work can be done by only designating the device on the display unit 200.

Figure 8A:
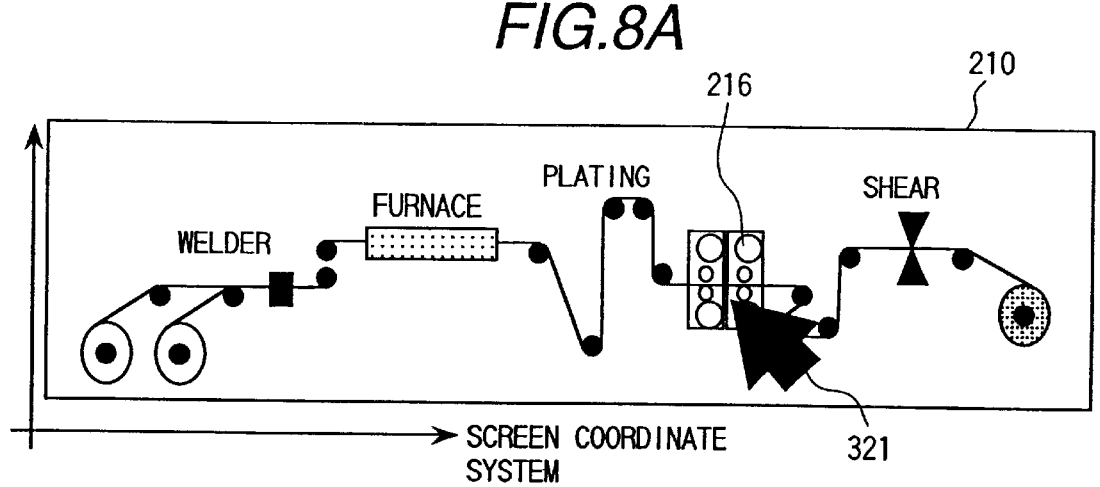
FIG. 8A is an explanatory diagram showing a displayed state of only the device layout diagram.
Figure 8B:
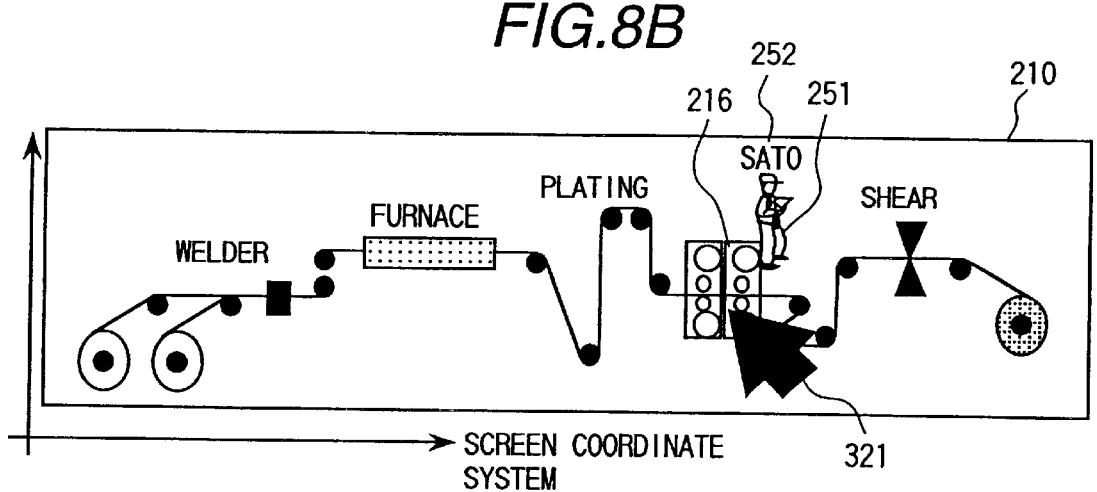
FIG. 8B is an explanatory diagram showing a displayed state of a worker associated with a designated device in the device layout diagram.
Figure 8C:
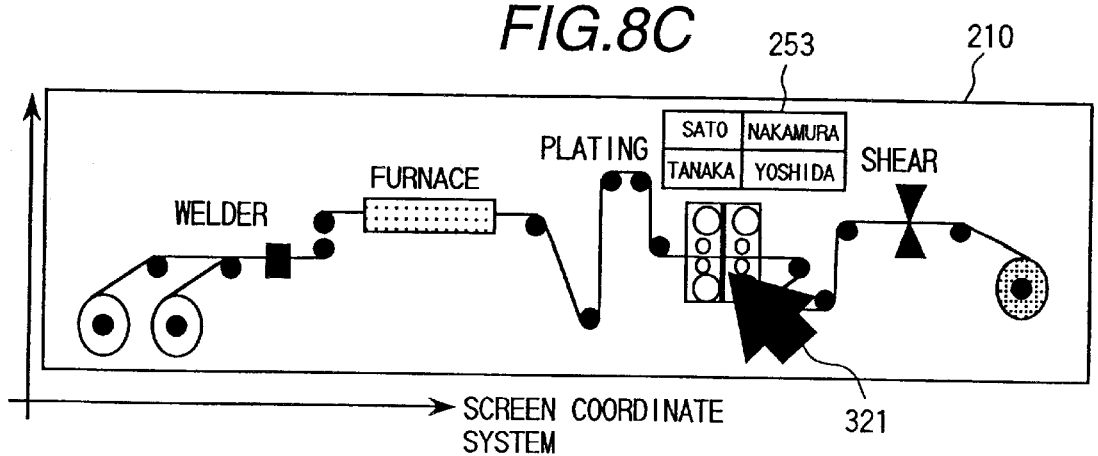
FIG. 8C is an explanatory diagram showing a listed stage of plural associated workers.
Figure 9:
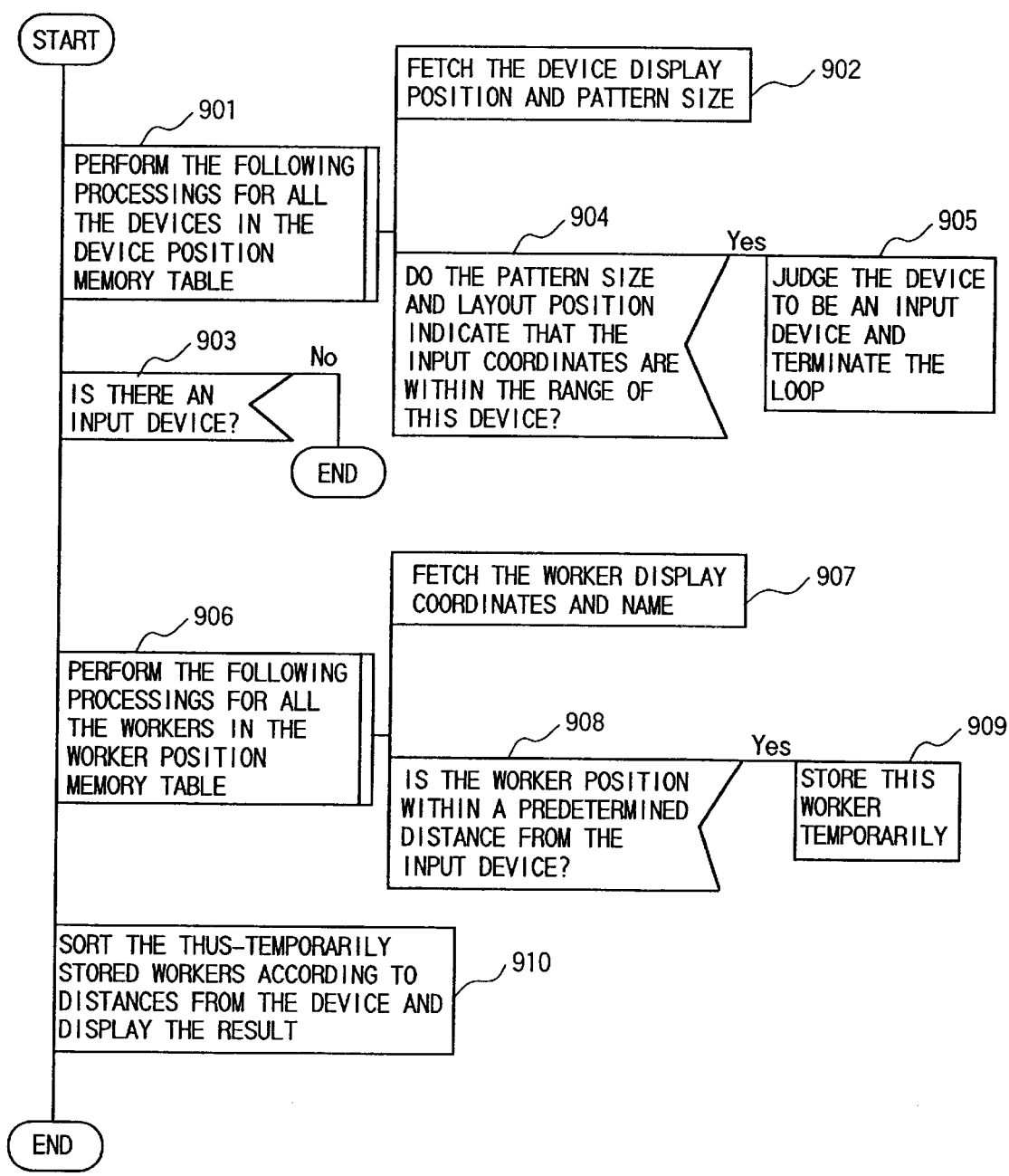
FIG. 9 is an explanatory diagram showing a flow of a processing for displaying an associated worker after receipt of device designation.

The above device designating method is also effective in the case where there is no display of worker on the display unit 210, as shown in FIG. 8A. In such a state of display as shown in FIG. 8A, if a device is indicated with the mouse pointer 321 and the right-hand button is depressed, the processing in FIG. 11 operates and it is made possible to communicate automatically with a person present near the device. There also may be adopted a slight modification of this method such that in the last step 1115 of FIG. 11 the workers detected by the illustrated processing are sorted in order of shorter distance from the device and communication is made with the person positioned nearest to the device. In this case, by merely indicating the display pattern of the device, it is possible to contact the worker closest to the device. In these examples, all that is required for the user is picking out only the device to be contacted, without the need of picking out a worker. Thus, it is possible to diminish the working load of the user.

Where there are plural workers, the workers may be listed in the window 253 so that a worker for communication can be selected, for example as shown in FIG. 8C. In this case, the workers may be arranged in order of rank so that communication can be made successively from a worker of a higher rank. By designating the entire list, communication may be made multi-addresswise for all the listed workers. Further, where plural workers are displayed, communication may be made multi-addresswise with designated workers by designating all or some of the workers.

Such a configuration means that the device display pattern functions as a command starting switch. As examples of commands defined for the device display pattern are mentioned a command to the effect that only the workers present near the device concerned should be picked out from the worker position memory table, a command to the effect that only the data of workers present near the device concerned should be sorted, and a command to the effect that communication should be started.

Figure 11:
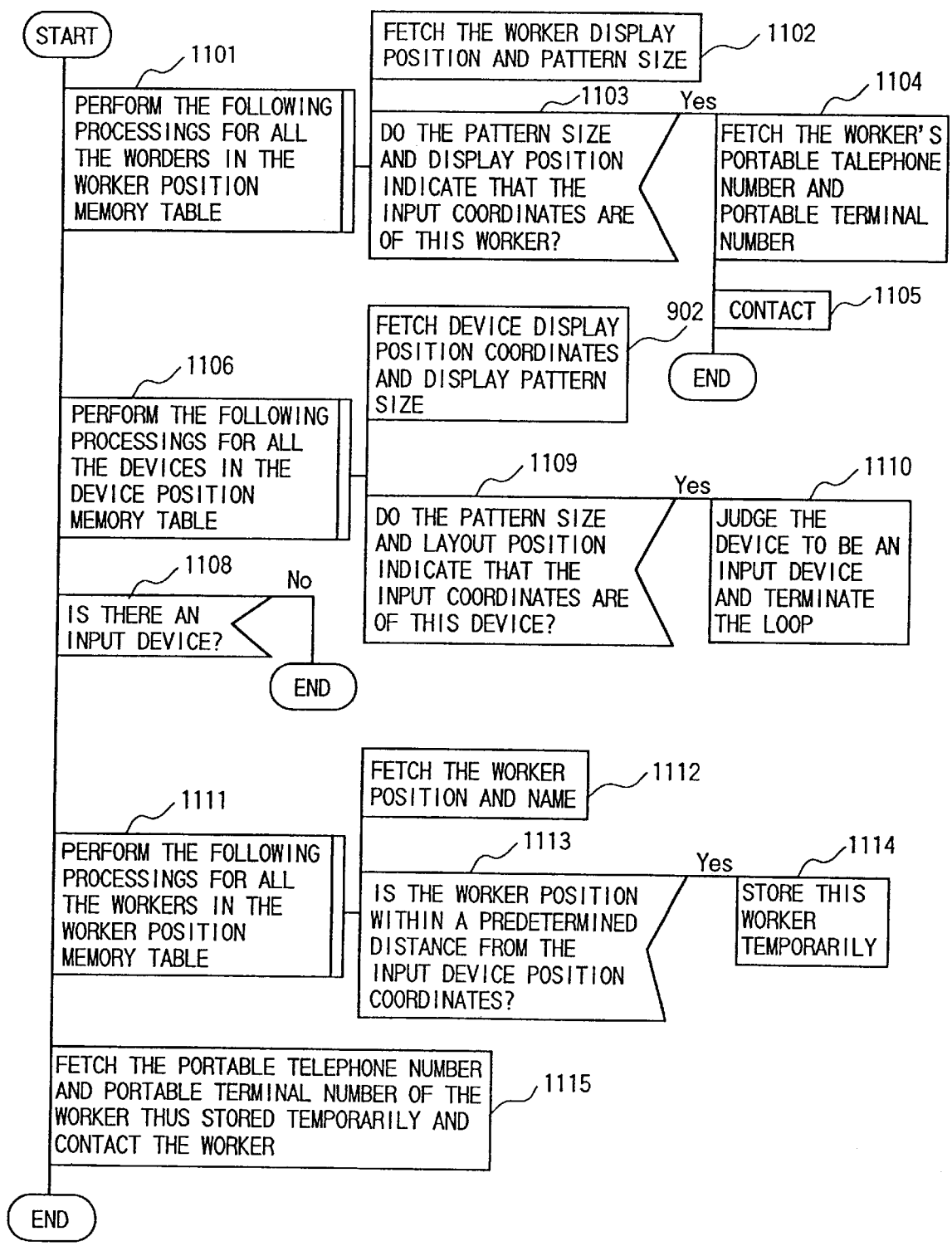
FIG. 11 is an explanatory diagram showing a processing procedure for making communication with a worker after receipt of designation for a worker display pattern.

Although in the above example of FIG. 11 communication has been described as an operation to be performed after having selected the device display pattern 433 or the worker display pattern 426, it may also be applicable to, for example, alarm indication to the portable terminal.

Next, the second embodiment of the present invention will now be described. The mobile control system of this embodiment can cover moving devices such as trains and automatic transportation devices. This second embodiment is different from the above first embodiment in that the objects to be covered by the first embodiment were immovable objects.

Figure 12:
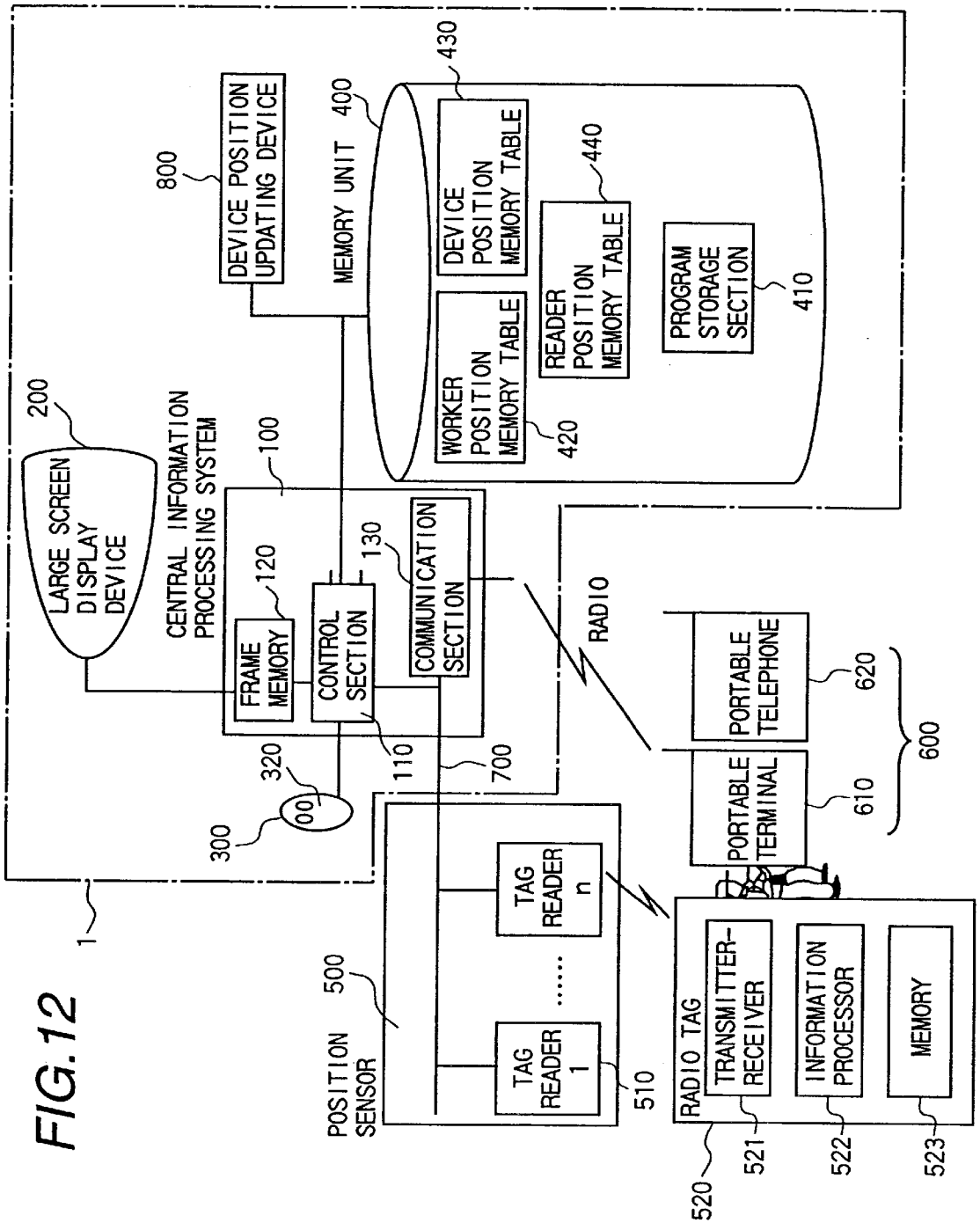
FIG. 12 is a block diagram showing a hardware system configuration of a control system according to the second embodiment of the present invention.

In the second embodiment, as shown in FIG. 12, a device position updating device 800 is added to the same mobile control system as that of the first embodiment, and a radio tag 520 is attached to a moving device. Further, each tag reader 510 has a function of discriminating whether the tag ID provided from the radio tag 520 is of a worker or of a device. This function can be attained by providing an information processor in each tag reader 510 with a tag ID discriminating function.

Figure 13:
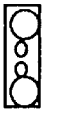
FIG. 13 is an explanatory diagram showing a device position memory table used in the second embodiment.

In this way the radio tag reader 510 reads in the tag ID sent from the radio tag 520 added to a moving device in addition to the radio tag carried by a worker. The tag reader 510 judges on the basis of the ID number added to each device whether the tag ID is of a worker or of a device. As shown in FIG. 13, the device position memory table 430 is further provided with a region 435 which stores the tag ID of the radio tag 520 of a moving device, in addition to the regions shown in FIG. 13.

In order to facilitate the judgment in the tag reader 510 as to whether the tag ID provided is of a worker or of a device, it is desirable to take an appropriate measure such as, for example, storing a list of tag IDs of devices in memory or representing the device tag ID itself in terms of a special code. In this embodiment, the tag ID for worker is represented using the symbol P and a numeral like P1, while the tag ID for device is represented using the symbol M and a numeral like M1.

In this embodiment, the device position updating device 800 is constituted by a processor and it inputs the data stored in the memory device 400 and executes various processings. More specifically, the device position updating device 800 checks tag IDs detected periodically by the position sensor 500, as well as installed position information of the tag reader 510 which has detected the tag ID. Further, on the basis of the detected tag ID, the device position updating device 800 specifies a device in the device position memory table 430 and changes the device position 432 in the device position memory table 430 to the installed position 442 of the said reader 510. As a result, the moving device concerned is displayed in the vicinity of the tag reader 510 which has detected the position of the device, and a worker associated with the moving device concerned is displayed near the moving device. Other processings to be done in this second embodiment are the same as in the previous first embodiment.

By the above method it is possible to effect in a simple manner the control of workers working at the site where the moving device is located.

Although in this second embodiment there is used an independent processor as the device position updating device 800, no limitation is made thereto. The processing to be performed by the device position updating device 800 may be carried out by the central information processing system 100. Further, although in the second embodiment it is the tag reader 510 that discriminates between a moving device and a worker, no limitation is made thereto. For example, the said discrimination may be done by the central information processing system 100.

In the embodiments described above, the position detection made by the position sensor 500 is based on the use of the radio tag. But this constitutes no limitation. For example, there may be adopted a position detecting method based on an installed position of a PHS or radio LAN communication base station, a position detecting method using a difference in field intensity or phase of radio waves transmitted from a plurality of places, which is utilized in PHS or GPS, or a position detecting method using a direction sensor or an acceleration sensor, which is used in a vehicular navigation system.

Although in the above embodiments the retrieval of workers can be made for a device concerned, this constitutes no limitation. A modification may be made such that in an area concerned is installed a tag reader independently of devices, and with its position as a specific retrieval key point, the whereabouts of personnel are controlled. In this case, a certain closed pattern is plotted on the display screen, and if a tag reader is located therein, then with the tag reader as a retrieval key point, it is possible to check, by looking up the worker position memory table, whether a worker is present within a predetermined radius.

Further, although in the above embodiments the memory unit is disposed outside the central information processing system, it may be disposed within the same system. Alternatively, it may be composed of plural memories.

According to the embodiments of the present invention, as set forth above, not only the positions of personnel can be detected each individually but also a pattern can be displayed at the detected position, whereby the distribution of personnel can be seen at a glance on a diagram which shows an area concerned. It is also possible to mask personnel and allow only the person or persons that meet certain conditions to be displayed. For example, with the designation of a device in a device layout diagram as a key, it is possible to let only the person or persons associated with the device to be displayed. Further, it is possible to represent plural persons in terms of a display pattern and, when the display pattern is indicated, display the plural persons as a list in a window for example.

Thus, the following effects can be expected according to the embodiments of the present invention.
(1) By utilizing a spatial sense it is possible to quickly find out a worker with whom communication is to be made and then start communication with the worker.
(2) By designating a device it is possible to display only the associated worker or workers efficiently.
(3) When communication is to be made with any person present near a device or when communication is to be made multi-addresswise with persons present near the device, it is possible to effect the communication work by merely designating the device on the display unit even without specifying a worker.
(4) By merely designating a device, without the need of specifying a worker, it is possible to quickly communicate with a worker present near the device.
(5) In the case where a plurality of workers are present, associated workers can be displayed in the form of a list by designating a device or by designating a worker pattern displayed as a representative pattern.
(6) Also for workers working on a moving device it is possible to effect a work control in a simple manner.

According to the present invention, as set forth hereinabove, it is possible to grasp a layout condition at a glance and also possible to quickly find out associated workers from among many workers. Moreover, by merely designating a specific area at a site, it is possible to find out a worker and make communication quickly with the worker.

What is claimed is:

1. A mobile control system for controlling moving bodies located in a specific area, comprising:
    a position sensor for detecting a current position or positions of one or more moving bodies located in said specific area; and
    a monitor system which displays a layout diagram of specific objects located in said specific area and which, upon receipt of an input indicating any of the displayed objects, checks whether there is any moving body in a predetermined region the current position of which moving body has been detected by said position sensor, with respect to the indicated object, and if said moving body is present, sorts said moving bodies in the order of the distance from the indicated object or in the order of the rank of said moving bodies, displays information symbolical of the moving body at a position in said layout diagram being displayed which position is determined on the basis of the current position of the moving body.

2. A mobile control system according to claim 1, wherein said position sensor comprises branch devices mounted respectively on said moving bodies and each having a peculiar identifier and master devices disposed at plural places in said specific area to detect the identifiers of said branch devices when the branch devices are located within a detectable region.

3. A mobile control system according to claim 2, wherein said monitor system displays a specific pattern as the information symbolical of each said moving body.

4. A mobile control system according to claim 3, wherein said monitor system performs a processing for further displaying the name of the moving body concerned at a position adjacent to said specific pattern.

5. A mobile control system according to claim 3 or claim 4, wherein said monitor system performs a processing whereby, when a plurality of moving bodies have been detected in one said master device, patterns symbolical of the moving bodies respectively are displayed so as to be shifted in position from each other.

6. A mobile control system according to claim 3 or claim 4, wherein when a plurality of moving bodies have been detected in one said master device, said monitor system displays as a representative pattern a pattern symbolical of any one of the moving bodies, and upon receipt of an indication designating said pattern, performs a processing for displaying information on the plural moving bodies.

7. A mobile control system according to claim 3 or claim 4, wherein said moving bodies and said monitor system are each provided with a communication device for mutual communication, and upon receipt of an indication designating any of the patterns symbolical of the moving bodies, said monitor system performs a processing for making communication with the moving body symbolized by the designated pattern through said communication device.

8. A mobile control system according to claim 3, wherein said moving bodies and said monitor system are each provided with a communication device for mutual communication, and said monitor system performs a processing for displaying patterns symbolical of said objects in said layout diagram, and upon receipt of an indication designating a pattern symbolical of any of the objects, and if the current position of any of the moving bodies has been detected in a region predetermined on the basis of the object symbolized by the designated pattern, performs a processing for making communication with the moving body concerned through said communication device.

9. A mobile control system according to claim 8, wherein when a plurality of moving bodies have been detected with respect to the designated object, a processing is performed so as to communicate with a moving body which is high in a predetermined rank.

10. A mobile control system according to claim 8, wherein when a plurality of moving bodies have been detected with respect to the designated object, a processing is performed so as to make a multi-address communication with the detected plural moving bodies.

11. A mobile control system according to claim 2, wherein said moving bodies are persons present in said specific area, and said branch devices transmit the identifiers allocated thereto to said master devices together with a radio wave, while said master devices receive said radio wave, take out the identifiers and detect the branch devices.

12. A mobile control system according to claim 2, wherein some of said objects are movable within said specific area and carry said branch devices.

13. A mobile control system for controlling on or more moving bodies moving in a specific area, comprising:

- a position sensor for detecting a current position or positions of one or more moving bodies located in said specific area;
- a display unit for displaying an image; a memory unit which stores at least information necessary for displaying a layout diagram of specific objects located in said specific area and information necessary for displaying the current positions of the moving bodies detected by said position sensor;
- a central information processing system which updates the information stored in said memory unit on the basis of the current positions of the moving bodies detected by said position sensor and which performs a processing for displaying on said display unit said layout diagram of the objects and the current positions of specific moving bodies; and
- an input device for receiving directions for said central information processing system,
- wherein said memory unit stores information indicative of positions of the objects included in said layout diagram, graphic pattern information for displaying the layout diagram and related display position information, information indicative of the current positions of the detected moving bodies, graphic information symbolical of the moving bodies and related display position information, and
- said central information processing system, upon receipt by said input device of an indication designating a specific object included in said layout diagram being displayed on said display unit, looks up moving bodies whose current positions lie in a predetermined region based on the current position of the designated object, and with respect to only the thus-retrieved moving bodies, sorts the thus-retrieved moving bodies in the order of the distance from the designated object or in the order of the rank of the thus-retrieved moving bodies, performs a processing for displaying their symbolical patterns on the display unit at positions indicated by said display position information.

14. A mobile control system for controlling moving bodies located in a specific area, comprising:

- a position sensor for detecting a current position or positions of one or more moving bodies located in said specific area; and
- a monitor system which displays a layout diagram of specific objects located in said specific area and which, upon receipt of an input indicating any area in said layout diagram, checks whether there is any moving body in the indicated area the current position of which moving body has been detected by said position sensor, and if said moving body is present, sorts said moving bodies in the order of the distance from the indicated object or in the order of the rank of said moving bodies, displays information symbolical of the moving body at a position in said layout diagram being displayed which position is determined on the basis of the current position of the moving body.

* * * * *